(12) United States Patent
Inui (10) Patent No.: US 6,546,150 B2
(45) Date of Patent: *Apr. 8, 2003

(54) ANALOGUE SIGNAL PROCESSING CIRCUIT

(75) Inventor: Fumihiro Inui, Atsugi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,817

(22) Filed: Dec. 2, 1997

(65) Prior Publication Data

US 2002/0006232 A1 Jan. 17, 2002

(30) Foreign Application Priority Data

Dec. 9, 1996 (JP) .............................. 8-328396

(51) Int. Cl.$^7$ ................................................ G06K 9/64
(52) U.S. Cl. ...................... 382/278; 348/301; 348/312; 348/323; 382/234; 382/236
(58) Field of Search ................................ 382/234, 236, 382/278; 369/116, 109; 348/104, 110, 230, 234, 302

(56) References Cited

U.S. PATENT DOCUMENTS

| | | | | |
|---|---|---|---|---|
| 4,051,329 A | * | 9/1977 | Blondet et al. ............. | 369/116 |
| 4,495,516 A | * | 1/1985 | Moore et al. ............... | 348/104 |
| 4,506,300 A | * | 3/1985 | Fernside ...................... | 348/110 |
| 4,683,498 A | * | 7/1987 | Topper ........................ | 348/302 |
| 5,182,622 A | * | 1/1993 | Iizuka et al. ................ | 257/231 |
| 5,184,212 A | * | 2/1993 | Yamamoto et al. .......... | 348/234 |
| 5,237,431 A | * | 8/1993 | Yoshiya ....................... | 358/445 |
| 5,315,262 A | * | 5/1994 | Schulz ........................ | 329/302 |
| 5,463,608 A | * | 10/1995 | Higuchi ....................... | 369/109 |
| 5,745,171 A | * | 4/1998 | Ogawa, et al. .............. | 382/234 |
| 5,764,289 A | * | 6/1998 | Fukui .......................... | 348/323 |
| 5,861,917 A | * | 1/1999 | Tariki ......................... | 348/230 |
| 5,864,406 A | * | 1/1999 | Isaka et al. .................. | 358/298 |
| 5,917,546 A | * | 6/1999 | Fukui .......................... | 348/296 |
| 5,963,344 A | * | 10/1999 | Morita ........................ | 358/482 |
| 6,330,031 B1 | * | 12/2001 | Petillie ........................ | 348/312 |
| 6,337,713 B1 | * | 1/2002 | Sato ............................ | 348/311 |
| 6,426,773 B1 | * | 7/2002 | Suzuki ........................ | 348/272 |

FOREIGN PATENT DOCUMENTS

EP 0473323 3/1992

\* cited by examiner

Primary Examiner—Bhavesh Mehta
Assistant Examiner—Gregory M. Desire
(74) Attorney, Agent, or Firm—Robin, Blecker & Daley (57) ABSTRACT

An object of the invention is to enable not only to select an ODD signal and an EVEN signal on the same timing but also to set up a duty ratio of the ODD-signal component to the EVEN signal component to be 50%.

The purposes are attained by use of a constitution wherein on an analogue signal processing circuit for processing the ODD-signal and the EVEN-signal divided from an output image signal produced from a CCD-type sensor to have the same phase which are then digitized by a singular A/D converter, a sample-hold circuit driven by a control signal during a CCD clock pulse period is provided in a correlated dual sampling circuit, which deals with the EVEN-signal, additionally with respect to another correlated dual sampling circuit, which deals with the ODD-signal, to shift a phase of the EVEN signal.

5 Claims, 5 Drawing Sheets

ANALOGUE SIGNAL PROCESSING CIRCUIT

BACKGROUND OF THE INVENTION

1. Field of the Invention

The present invention relates to a signal processing circuit for processing an analogue signal and, more particularly, to those for processing an output signal produced from an image sensor.

2. Brief Description of the Related Art

Up to now, an image reading apparatus, which detects an objective picture such as an original manuscript by use of an image sensor to transmit an image signal, has been known.

As the image sensors thereby used for obtaining aforesaid image signals, there exist Charge Coupled Device (referred to as "CCD" hereinafter)-type image sensors and Metal Oxide Semiconductor (referred to as "MOS")-type image sensors. The CCD-type image sensors, which have many advantages such as a high sensitivity, a high integration density and low noise characteristics, have been particularly used.

Figure 6:
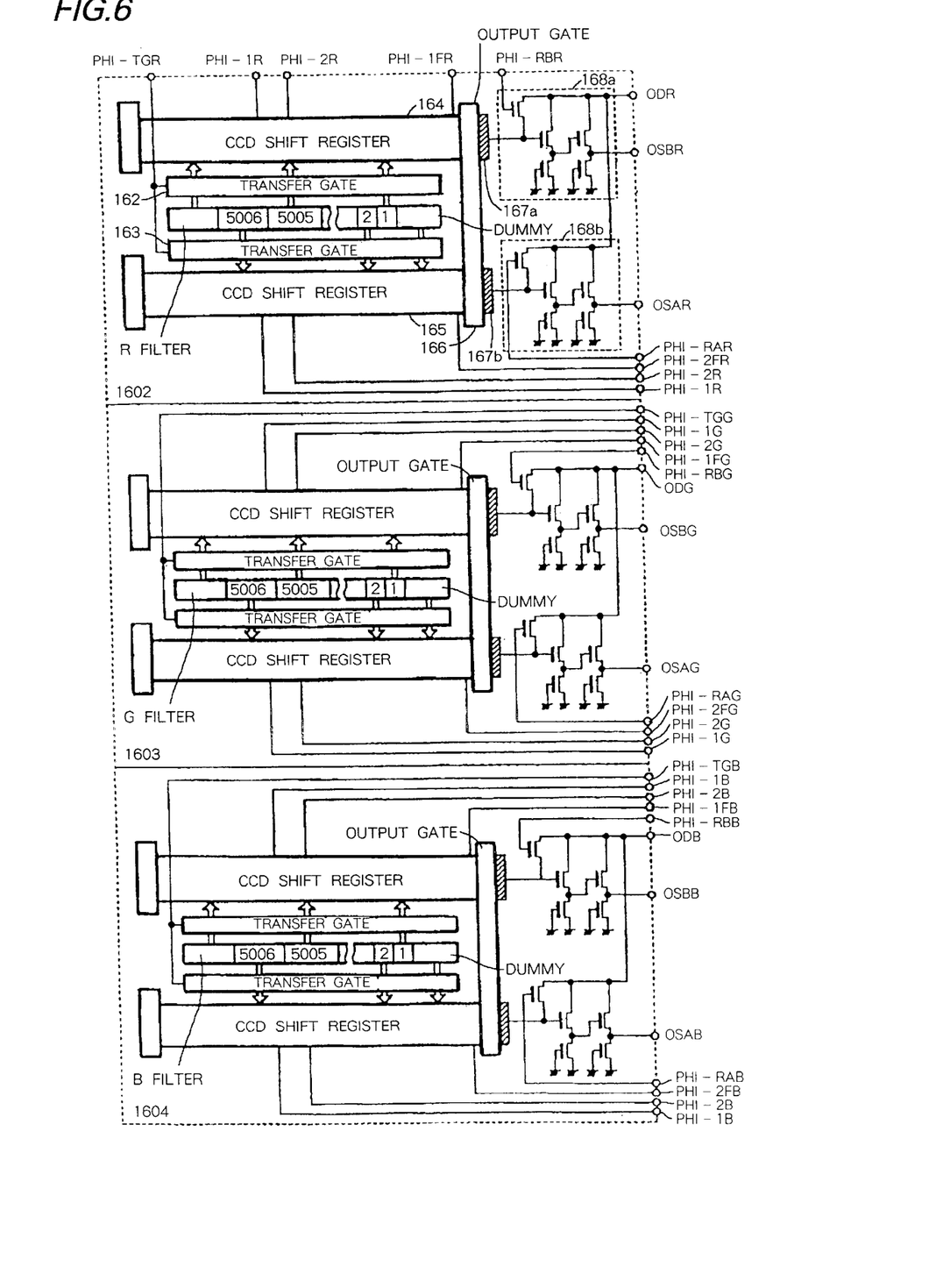
FIG. 6 is a circuit diagram showing a color CCD-type linear image sensor used both in the present invention and in the conventional circuit.

Actually, an example of color CCD-type linear image sensors is illustrated in FIG. 6. In FIG. 6, the color CCD-type linear image sensor 1601 is formed of a three-lined color CCD-type linear image sensor, wherein three pieces of CCD chips 1602–1604 provided respectively with a red, a green and a blue (referred to as "R", "G" and "B" hereinafter) on-wafer-type color filters are disposed on a silicon wafer in parallel to each other.

Because each constitution of the R, the G and the B CCD chips is common in FIG. 6, the chip constitution is described only about the R chip. A light receiving part 161 formed of photoelectric transducing elements 1–5006, which transduce the optical energy to the electric energy in response to incident luminous quantities are aligned in a row. The R, the G and the B color separation filters are provided in an on-wafer status covering the CCD sensor elements constituting the light receiving part 161. In a forefront of the light receiving part 161 formed of the CCD sensor elements aligned in a row, there exists further a light-shaded pixel which is formed by masking a pixel with an aluminium mask for shading an incident light, namely, the dummy element thereby to generate an output signal during a dark status.

Transfer gates 162 and 163 are to transfer charges, which have been accumulated in the light receiving part 161 in response to the incident luminous quantities, to CCD-type shift registers 164 and 165 when they receive a shift gate pulse PHI-TG. The charges, which have been accumulated in the pixels having odd numbers of the light receiving part 161, are transferred through the transfer gates 162 to the CCD-type shift register 164 in use for the odd-numbered pixels. On the other hand, the charges, which are accumulated in the pixels having even numbers of the light receiving part 161, are transferred through the transfer gate 163 to the CCD-type shift register 165 in use for even-numbered pixels.

The CCD-type shift registers 164 and 165 transfer the charges, which have been applied from the light receiving part 161, to an output part. The CCD-type shift registers 164 and 165 are two phase-driven by a clock signal PHI-1 (PHI-1R, PHI-1FR, PHI-1G, PHI-1FG, PHI-1B, PHI-1FB) in use for driving the odd-numbered pixels and another clock signal PHI-2 (PHI-2R, PHI-2FR, PHI-2G, PHI-2FG, PHI-2B, PHI-2FB) in use for driving the even-numbered pixels.

Furthermore, an output gate 166 is to transmit each of the pixel charges stored in the CCD-type registers 164 and 165 into output capacitive ports 167a and 167b, which are to transform the transferred charges into voltage signals. Source follower amplifiers 168a and 168b each having two stages serve as circuits which prevent noises from accompanying with output signals by reducing output impedances. The output capacitive ports 167a and 167b together with the source follower amplifiers 168a and 168b constitute a Eloating Differential Amplifier (referred to as "FDA" hereinafter).

Herein an output signal terminal OSBR is a signal terminal thereby detecting a signal applied from the odd-numbered pixels of the red color chip. Another output signal terminal OSAR is a signal terminal thereby detecting a signal applied from the even-numbered pixels of the red color chip. Similarly, output signal terminals OSBG, OSAG, OSBB and OSAB are respective output signal terminals thereby detecting signals respectively applied from the odd-numbered pixels and the even-numbered pixels of the green and the blue chips, respectively. On the other hand, PHI-RBR, PHI-RAR, PHI-RBG, PHI-RAG, PHI-RBB and PHI-RAB are reset pulse terminals while PHI-1R, PHI-1G, PHI-1B, PHI-2R, PHI-2G and PHI-2B are clock terminals of the CCD-type shift registers. Similarly, PHI-TGR, PHI-TGG and PHI-TGB are clock terminals of the transfer gates while PHI-ODR, PHI-ODG and PHI-ODB are drain terminals of the source follower amplifiers.

In the color image sensor 1601 constituted as mentioned above, rays of the lights incident to the light receiving part 161 are transformed into electric charges, of which quantities are proportional to the luminous energies. Those electric charges are transferred to the CCD-type shift registers 164 and 165 by applying the clock pulse PHI-TGR to the transfer gates 162 and 163, being separated into the odd-numbered image pixels and the even-numbered image pixels.

Subsequently, CCD pixel signals are applied bit by bit through the output gate 166 to the output capacitive ports 167a and 167b of the FDA in response to the driving clock pulses PHI-1 and PHI-2. The output capacitive ports 167a and 167b transform the output signals produced as the charge signals into the voltage signals, which are then transmitted respectively through the two-staged source follower amplifiers 168a and 168b and through the output terminals OSB and OSA. As mentioned above, to read-out the charges stored in the CCD-type line sensor integrated in a high density by separating into two pixel groups, wherein one has the odd numbers and another has the even numbers, reduces a reset time and a signal processing time of the pixel.

Figure 2:
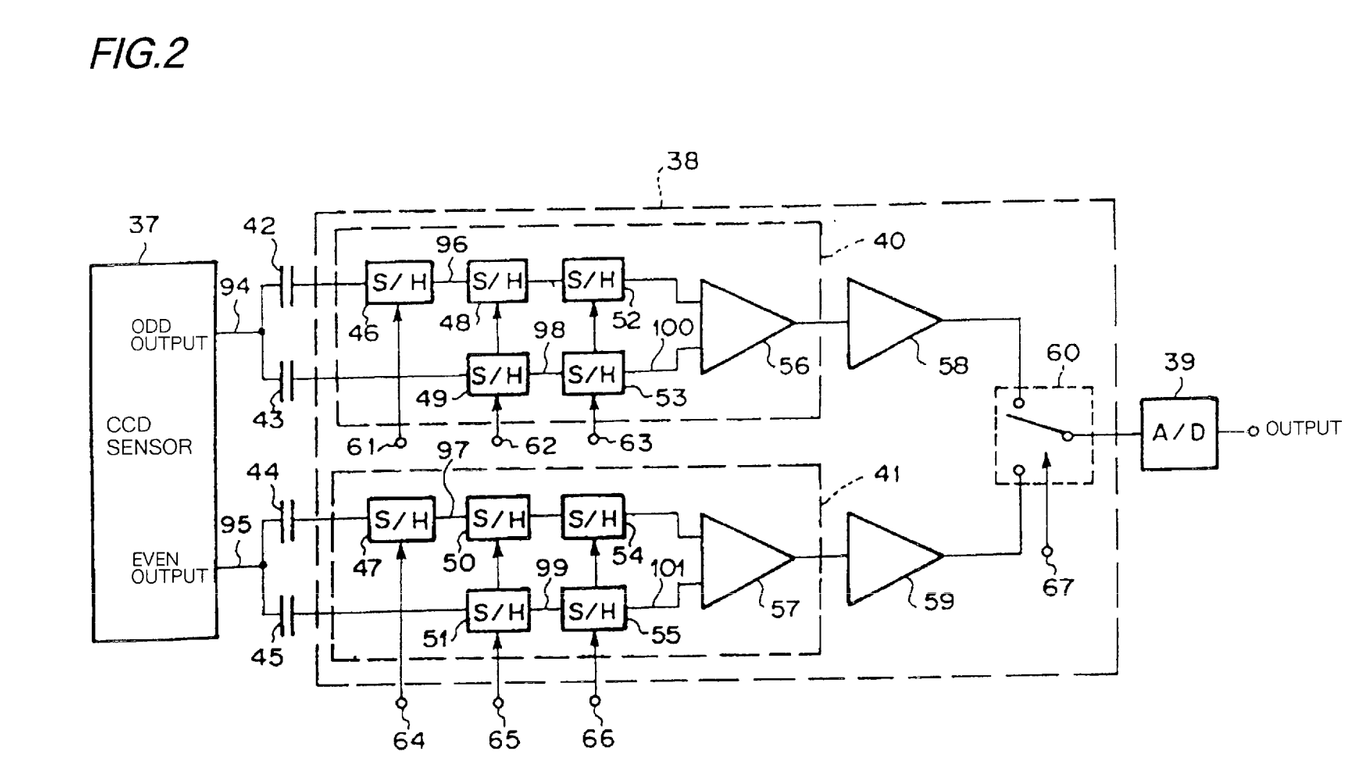
FIG. 2 is a block diagram showing a conventional signal processing circuit.
Figure 4:
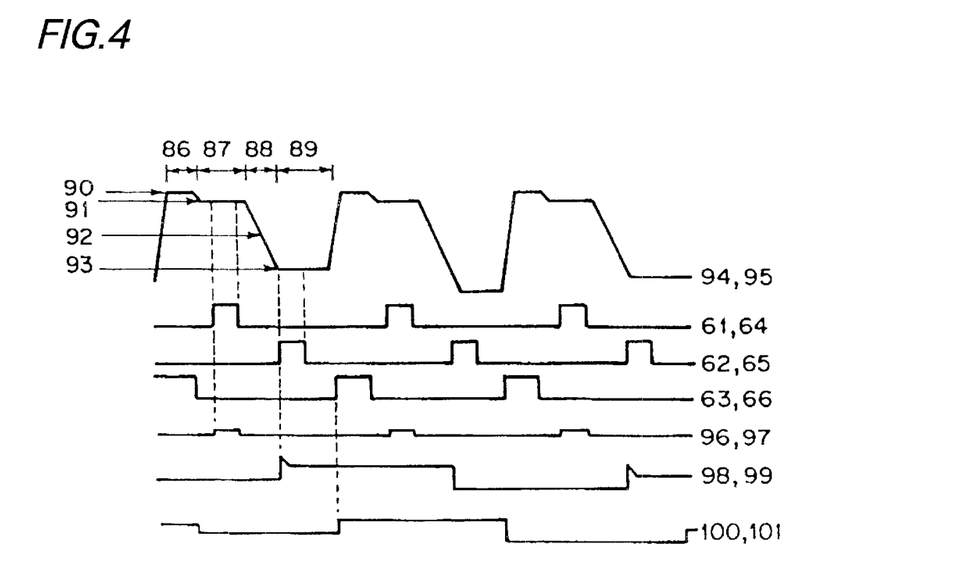
FIG. 4 is a timing chart for illustrating operations of the conventional signal processing circuit.

Next, a signal processing circuitry shown in FIG. 2 is used to process the ODD and EVEN image signals transmitted from aforesaid color CCD-type linear image sensor till a stage for converting into digital signals. FIG. 4 is a timing chart during signal processing in the circuitry shown in FIG. 2.

As shown in FIG. 2, an analogue signal processing system 38, which transmits its own output signal to an analogue to digital (referred to "A/D" hereinafter) converter 39 by receiving the output signals produced from the CCD-type sensor 37, is constituted of correlated dual sampling circuits 40 and 41, amplifiers 58 and 59 and a multiplexer circuit 60. The two output signals, which are transmitted from the CCD-type sensor 37 and have the same phase (Herein ODD signal means an output signal produced from pixels having the odd numbers of the CCD-type sensor while EVEN signal means another output signal produced from pixels having the even numbers.), are respectively subjected to two independent and equivalent analogue signal processings until they are sequentially selected and synthesized in the multiplexer circuit 60. So the signal processing operation is described only about the circuit, which deals with the ODD signal.

As can be seen from FIG. 4, each pixel of the CCD output signal 94 has a reset period 86, a feedthrough period 87, a CCD clock component transmitting period 88 and a signal component transmitting period 89. The CCD-type sensor 37 applies the signals, which have different off-sets with respect to a reset potential 90, to each image pixel. The correlated dual sampling circuit 40 serves as a constitution which removes the off-sets and extracts precisely the signal components. This correlated dual sampling circuit 40 is composed of a sample-hold circuit 46, which performs a sampling operation by applying a control signal 61 during the feedthrough period 87, of another sample-hold circuit 49, which performs another sampling operation by applying another control signal 62 during the signal component transmitting period 89, and of a still another sample-hold circuit 53 in use for transfer, which prevents the clock component 92 included in the CCD output signal from propagating toward the following amplifier and other circuits located on the subsequent stages. A differential circuit 56 is included in the sampling circuit 40 and extracts a potential difference between two signals obtained by samplings respectively during the feedthrough period and during the signal component transmitting period. Consequently, the sampling circuit 40 eliminates unnecessary off-sets generated during the reset period to extract the precise signals by use of the differential circuit 56.

An amplifier 58 located on a subsequent stage is to amplify the output signal transmitted from the correlated dual sampling circuit 40 to a signal level adequate for a dynamic range of an input port of the A/D converter 39.

The signal processing operations have been described with reference to the ODD signal processing circuit up to now. As to the EVEN signal, the same signal processing operations are to be performed.

Finally, the multiplexer circuit 60 selects the ODD signal and the EVEN signal transmitted from the respective amplifiers, which correspond to the respective pixels, to synthesize the image signal having an one-line length of the CCD-type linear image sensor to apply the output signal to the A/D converter 39. A relative moving of the objective picture with respect to the CCD-type linear image sensor can attain the image signal of a whole area covering the objective picture.

However, the constitution, wherein the ODD signal and the EVEN signal are transmitted respectively in the same phase from the output signal of the CCD-type sensor and the multiplexer circuit re-synthesizes an image signal out of the two signals to be subject to the A/D conversion, has encountered with a problem that the selections of the ODD signal and the EVEN signal cannot be performed on the same timing. This constitution has further encountered with another problem that it is difficult to set up a duty ratio of the ODD signal component relative to the EVEN signal component to be 50:50 during the synthesis in the multiplexer circuit.

SUMMARY OF THE INVENTION

An object of the invention is to render it easily enabling to control phase shifts in plurality of image signals.

To satisfy the purposes mentioned above, an embodiment according to the present invention provides an image signal processing circuit, whereto a first image signal and a second image signal are applied, comprising:

a first correlated dual sampling circuit which samples the first image signal;

a second correlated dual sampling circuit which samples the second image signal; and a phase shifting means which shifts a phase of the first image signal:

wherein the phase shifting means is constituted to be provided within the first correlated dual sampling circuit.

By constituting the present invention as mentioned above, the present invention makes it easily possible to adjust the phase shifts of the plurality of the image signals as well as to adjust simultaneously the amplitude levels of the image signals.

DETAILED DESCRIPTION OF THE PREFERRED EMBODIMENTS

Hereinafter described is the best mode carrying out the present invention into practice, corresponding to the preferred embodiments.

Embodiment 1

Figure 1:
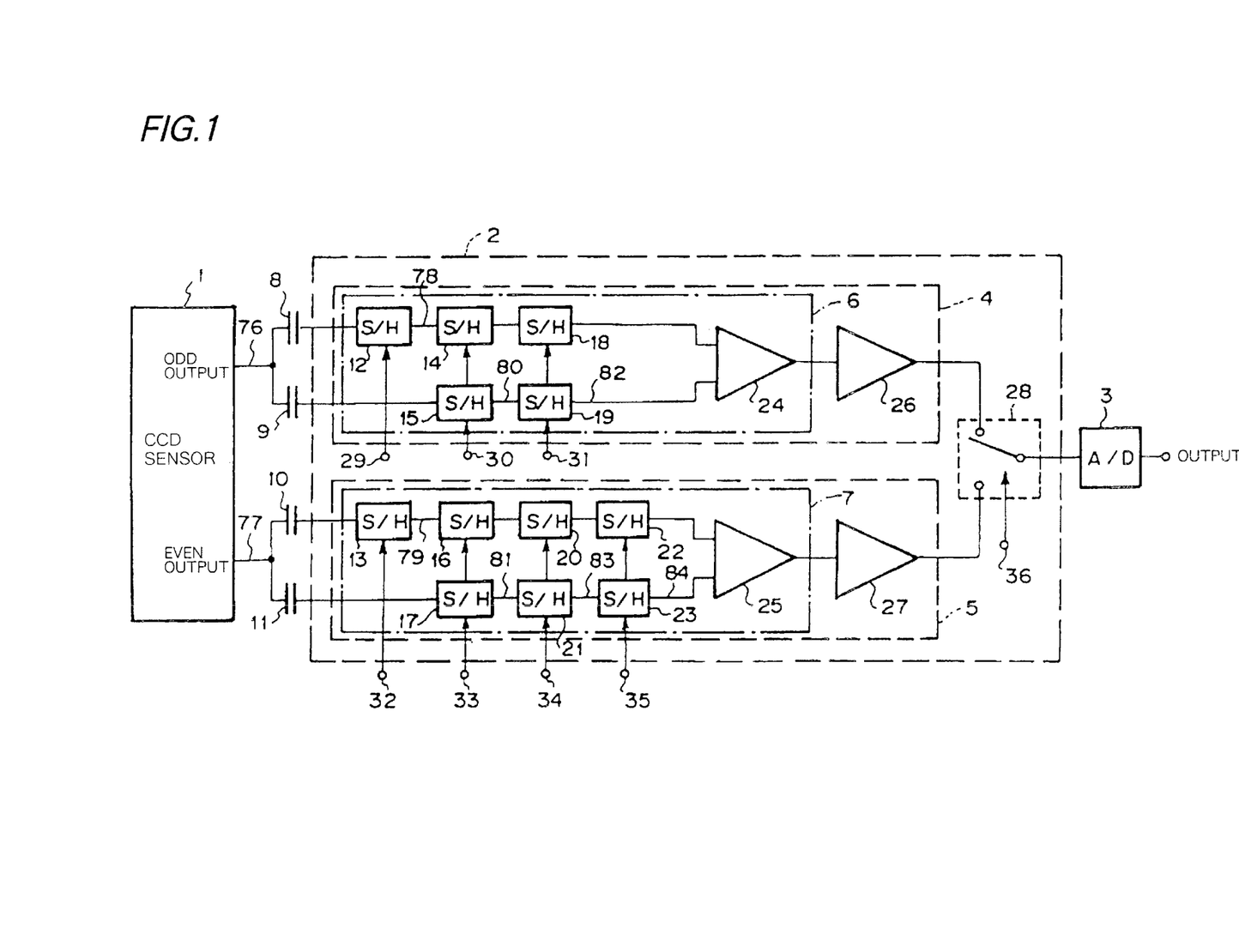
FIG. 1 is a block diagram showing a signal processing circuit of Embodiment 1 according to the present invention.

Hereinafter a mode carrying out the present invention into practice will be detailed with reference to FIG. 1. In FIG. 1, a numeral sign 1 stands for a CCD-type line sensor, 2 stands for an analogue signal processing circuit, 3 stands for an A/D converter, 4 stands for an ODD signal processing system, 5 stands for an EVEN signal processing system, from 8 to 11 stand for capacitors, from 12 to 23 stand for sample-hold circuits, from 29 to 35 stand for control signals thereby to switch modes of the respective sample-hold circuits between sampling modes and holding modes, 24 and 25 stand for differential circuits, 28 stands for a multiplexer circuit and 36 stands for its switching control signal.

The CCD-type line sensor 1 divides individual pixels of the sensor into pixels having odd numbers (ODD signal) and the pixels having the even number (EVEN signal) to transmit the two signals having the same phase shift through the shift registers. The ODD signal transmitted from the CCD-type line sensor is further branched into two signals, which are then applied through the capacitors 8 and 9 to the sample-hold circuits 12 and 15.

On the other hand, the EVEN signal is also branched into two signals, which are respectively applied through the capacitors 10 and 11 to the sample-hold circuits 13 and 17. Both of the ODD signal and the EVEN signal pass through the respective signal processing systems, which process the respective signals independently of each other, until a singular signal is synthesized out of the two signals in the multiplexer circuit 28.

First, the ODD signal processing system 4 for processing the ODD signal will be described. The ODD signal processing system 4 includes a correlated dual sampling circuit 6 extracting a difference between potentials of two signals, which are extracted in a certain timing, and an amplifier 26, which amplifies a signal transmitted from the correlated dual sampling circuit 6. This correlated dual sampling circuit 6 is composed of the sample-hold circuits 12, 14 and 18 which extract and transfer a potential 73 during the feedthrough period, composed of the sample-hold circuits 15 and 19 which extract and transfer another potential 75 during the signal component transmitting period and composed of the differential circuit 24 which extracts a difference between potential 73 during the feedthrough period and the potential 75 during the signal component transmitting period.

Figure 3:
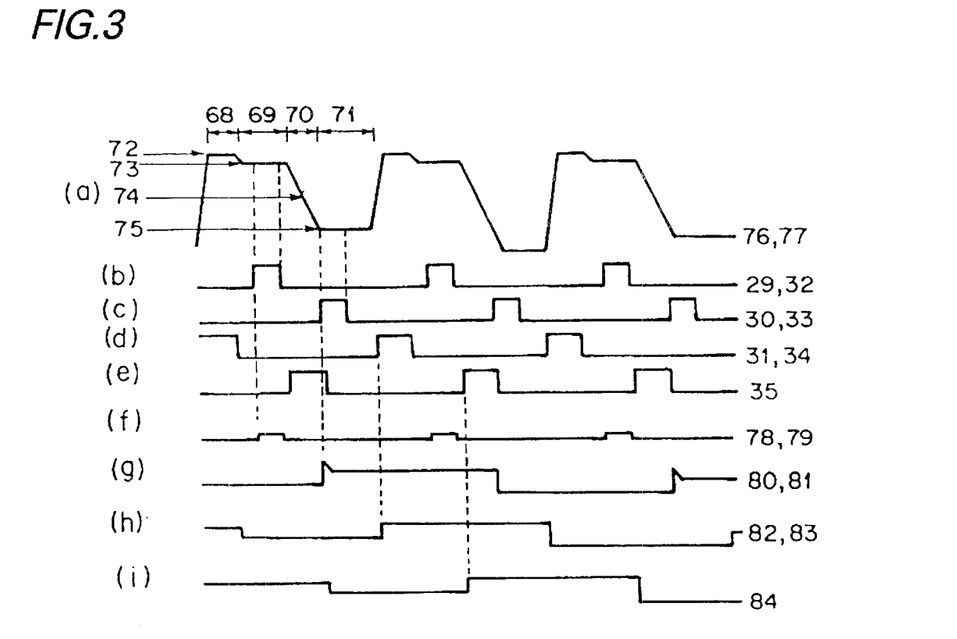
FIG. 3 is a timing chart for illustrating operations of preferred embodiments according to the present invention.

Taking above-mentioned constitution into a consideration, the operations of the correlated dual sampling circuit will be described with reference to FIG. 3. As shown in FIG. 3, each pixel in an output signal 76 of the CCD-type line sensor includes the reset period 68, the feedthrough period 69, a CCD clock component transmitting period 70 and the signal component transmitting period 71.

On the other hand, as the control signals for switching the operational modes of the sample-hold circuits, there are the control signal 29 which is provided with a sampling pulse in each feedthrough period 69, the control signal 30 which is provided with another sampling pulse in each signal component transmitting period 71 and the control signal 31 which is provided with still another sampling pulse between each two sampling pulses of the control signal 30. The control signal 29 is applied to the sample-hold circuit 12 and the control signal 30 is applied to the sample-hold circuits 14 and 15, respectively, while the control signal 31 is applied to the sample-hold circuits 18 and 19, respectively.

The two branched ODD signals are firstly applied to the sample-hold circuits 12 and 15 respectively shown in FIG. 1. The sample-hold circuit 12 receives the control signal 29 during the feedthrough period as shown in FIG. 3(b) to sample-hold the potential 73 during the feedthrough period shown in FIG. 3(a) as a waveform 78 shown in FIG. 3(f). The waveform 78 is transferred sequentially to the sample-hold circuit 14 and then to the sample-hold circuit 18 to be finally supplied to the differential circuit 24.

On the other hand, the sample-hold circuit 15 receives the control signal 30 during the signal component transmitting period as shown in FIG. 3(c) to sample-hold the potential 75 during the signal component transmitting period as a waveform 80 shown in FIG. 3(g). The waveform 80 is further transferred to the sample-hold circuit 19, which then generates another waveform 82 shown in FIG. 3(h) to be supplied to the differential circuit 24.

Herein the sample-hold circuits 18 and 19 are to eliminate noise signals composed of the CCD clock components and the like, which are liable to be picked up by the sample-hold circuits 14 and 15 located on the fore stages during the reset period 68 shown in FIG. 3(a), by means of applying the control signal 31 shown in FIG. 3(d). The differential circuit 24 extracts a potential difference between two signals respectively transferred from the sample-hold circuits 18 and 19, therewith to supply to the amplifier 26. The amplifier 26 located on the subsequent stage provides the ODD signal with an adequate gain relative to the EVEN signal, before supplying the ODD signal to the multiplexer circuit 28.

On the other hand, the EVEN signal processing system 5 is dissimilar to the ODD signal processing system 4 from the standpoint that the sample-hold circuits 22 and 23 are inserted between the differential circuit 25 and the sample-hold circuits 20 and 21. The two branched EVEN signals, which are processed similarly to the ODD signal processing system 4 till the sample-hold circuits 20 and 21, are subsequently applied to the newly inserted sample-hold circuits 22 and 23 to be transferred further.

In that event, the control signal 35 applied to the sample-hold circuits 22 and 23 has a timing wherein the phase is shifted by 180° with respect to that of the control signal 31, which is applied to the sample-hold circuits 18 and 19 as can be seen from FIG. 3(e). Consequently, an output signal 82 shown in FIG. 3(h), which is produced from the sample-hold circuit 19 and applied through the differential circuit 24 and the amplifier 26 of the ODD signal processing system 4 to the multiplexer circuit 28, has a phase shifted by 180° from that of another output signal 84 shown in FIG. 3(i), which is produced from the sample-hold circuit 23 and applied through the differential circuit 35 and the amplifier 27 of the EVEN signal processing system 5 to the multiplexer circuit 28.

Because the EVEN signal herein has the phase shifted by 180° with respect to that of ODD signal, the switching control signal 36 of the multiplexer circuit 28 is applied so that an electric connection is switched from one to another at the duty ratio of 50%. The multiplexer circuit switches its connection sequentially to the ODD signal, to the EVEN signal, to the ODD signal, to the EVEN signal, . . . and so on to produce an output signal, which enables to synthesize the image signals having one line length's pixels of the line sensor.

By this constitution wherein the image signal is synthesized by use of the multiplexer circuit out of the ODD signal and the EVEN signal, which are transmitted in the same phases from the CCD-type line sensor, and is subjected to the A/D conversion, the present embodiment makes it possible not only to select both the ODD signal and the EVEN signal at the same timing but also to set up the duty ratio of the ODD signal component relative to the EVEN signal component at 50%.

Embodiment 2

Figure 5:
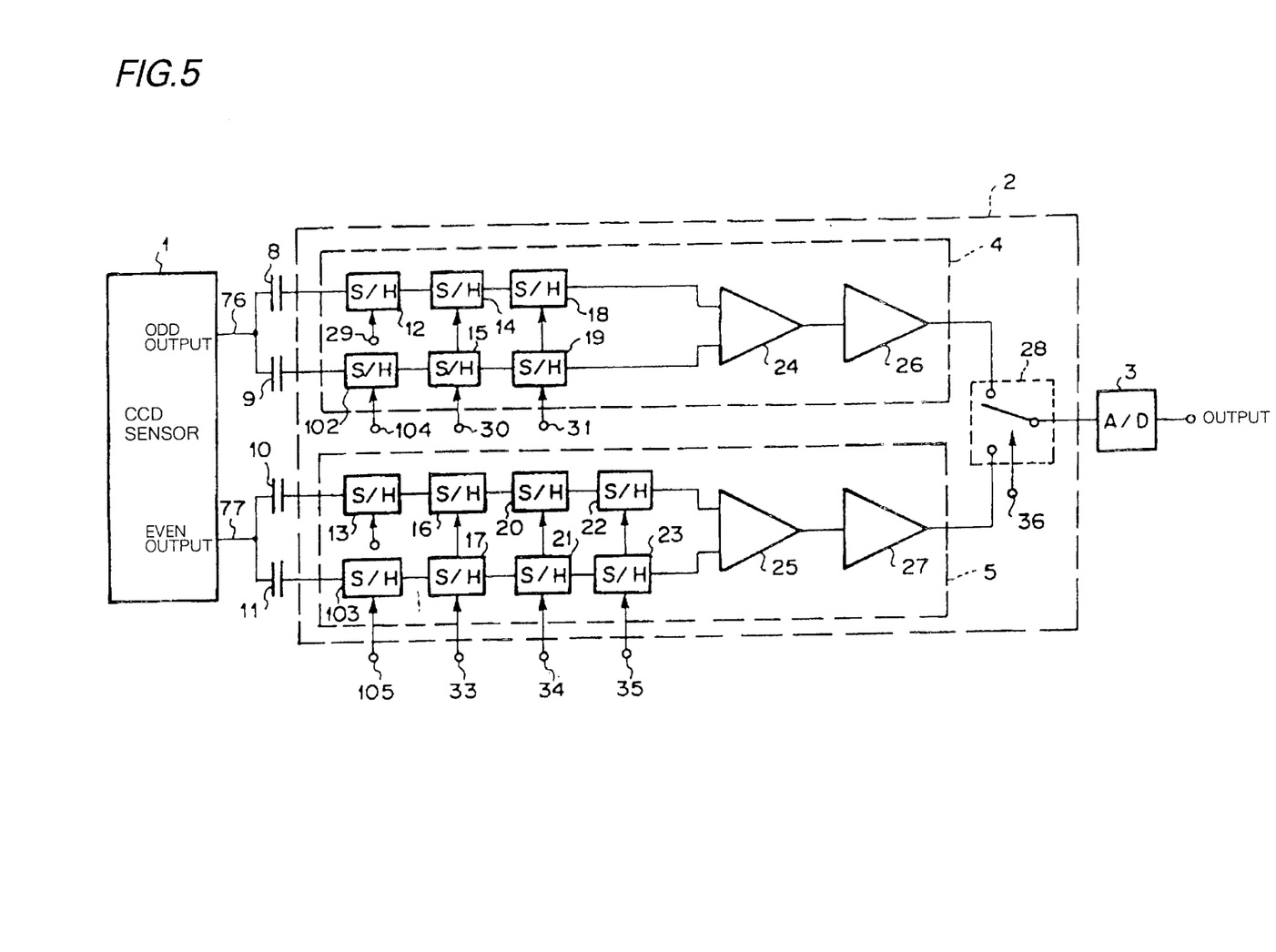
FIG. 5 is a block diagram showing a signal processing circuit of Embodiment 2 according to the present invention.

In Embodiment 1, precisions in the output signals produced from the correlated dual sampling circuits turn worsened if the respective sample-hold circuits include the off-sets or gain errors. As shown in FIG. 5, if sample-hold circuits 102 and 103, which pass the pixel signals being unchanged by fixing the control signals 104 and 105 thereby to maintain those circuits 102 and 103 on the sampling status, are attached respectively between the capacitor 9 and the sample-hold circuit 30 as well as between the capacitor 11 and the sample-hold circuit 33, the off-set and the gain error-induced worsenings of the signal precision can be avoided.

Actually, a timing signal, which is synthesized by supurimposing the three control signals shown respectively in FIGS. 3(b), 3(c) and 3(d), is applied as each of the control signals 104 and 105 to the sample-hold circuits 102 and 103 to sample-hold respectively the ODD and the EVEN signals during each period to transfer respectively the signals to the following sample-hold circuits 15 and 17. Those constitutions can reduce remarkably the noises, which generate during vacant periods of the correlated dual sampling circuits, as well as the noise-induced off-sets. Furthermore, because a branched signal path has the same stage number in sample-hold circuit with respect to anther branched signal path located within the same correlated dual sampling circuit, attenuations and the gains between two branched paths within a correlated dual sampling circuit can be equalized.

As mentioned above, the embodiments according to the present invention enable to select each signal at the same timing as well as to set up the duty ratio to be 50:50 between the ODD signal component and the EVEN signal component which are synthesized by use of the multiplexer circuit.

What is claimed is:

1. An image signal processing circuit whereto image signals with odd-numbered pixels and with even-numbered pixels having the same phase outputted a line image sensor are applied, comprising:

(A) a first correlated dual sampling circuit which samples odd-numbered pixel signals outputted from odd-numbered pixels of said line image sensor;

(B) a second correlated dual sampling circuit which samples even-numbered pixel signals outputted from even-numbered pixels of said line image sensor, wherein said sampling is executed at a same sampling timing of said odd-numbered pixel signals; and (C) a sample-bald circuit which shifts the phase of said even-numbered pixel signals which were sampled by said second correlated dual sampling circuit from the phase of said odd-numbered pixel signals which were sampled by said first correlated dual sampling circuit by a predetermined phase angle, wherein said sample-hold circuit is included in said second correlated dual sampling circuit.

2. The image signaling processing circuit according to claim 1, further comprising:

a selecting unit which selects one of said first image signal and said second image signal.

3. The image signal processing circuit according to claim 2, further comprising:

a synthesizing unit which synthesizes another image signal out of said first image signal and said second image signal selected by use of said selecting unit.

4. The image signal processing circuit according to claim 1, further comprising:

amplifying circuits which respectively amplifies output signals respectively produced from said first correlated dual sampling circuit and said second correlated dual sampling circuit.

5. The image signal processing circuit according to claim 1, wherein:

each of said first correlated dual sampling circuit and said second correlated dual sampling circuit is composed of a plurality of sample-hold circuits and a differential amplifier.

* * * * *

UNITED STATES PATENT AND TRADEMARK OFFICE
CERTIFICATE OF CORRECTION

PATENT NO.    : 6,546,150 B2
DATED         : April 8, 2003
INVENTOR(S)   : Fumihiro Inui It is certified that error appears in the above-identified patent and that said Letters Patent is hereby corrected as shown below:

<u>Column 7,</u>
Line 14, after "outputted" insert -- from --.
Line 25, delete "sample-bald" and insert -- sample-hold --.

Signed and Sealed this

Twenty-first Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,546,150 B2
DATED : April 8, 2003
INVENTOR(S) : Fumihiro Inui

It is certified that error appears in the above-identified patent and that said Letters Patent is hereby corrected as shown below:

Column 7,
Line 14, after "outputted" insert -- from --.
Line 25, delete "sample-bald" and insert -- sample-hold --.

Signed and Sealed this

Twenty-third Day of December, 2003

JAMES E. ROGAN
*Director of the United States Patent and Trademark Office*